Figure 1:
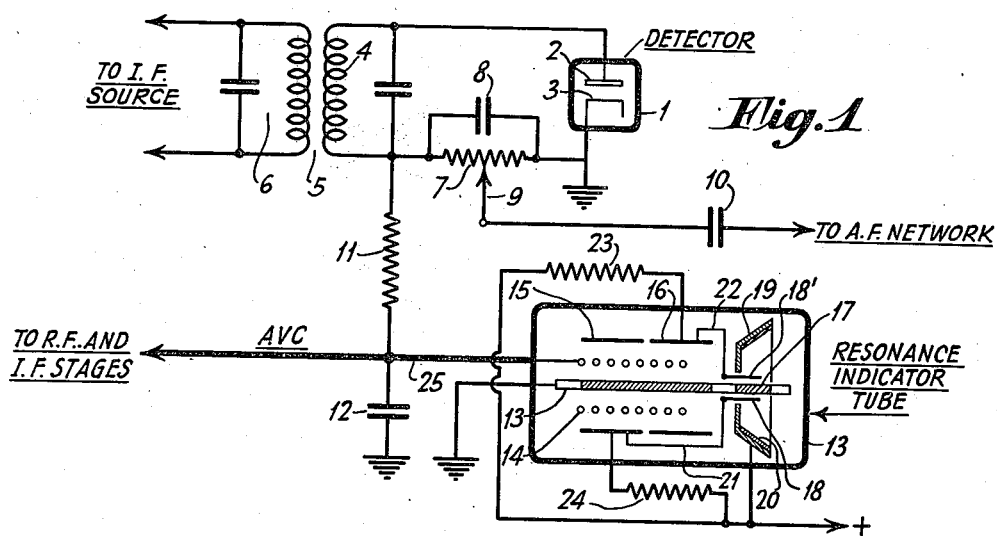

May 23, 1939. C. N. KIMBALL ET AL 2,159,802
TUNING INDICATOR CIRCUIT
Original Filed Nov. 24, 1936

INVENTORS
CHARLES N. KIMBALL
AND EDWARD W. WILBY
BY
ATTORNEY

Patented May 23, 1939

2,159,802

UNITED STATES PATENT OFFICE 2,159,802

TUNING INDICATOR CIRCUIT

Charles N. Kimball, East Orange, N. J., and Edward W. Wilby, Westerleigh, Staten Island, N. Y., assignors to Radio Corporation of America, a corporation of Delaware Application November 24, 1936, Serial No. 112,462
Renewed July 19, 1938

11 Claims. (Cl. 250—40)

Our present invention relates to electron ray indicator tube circuits, and more particularly to electron ray tube circuits adapted for indicating resonance in radio receivers thereby insuring proper tuning.

There has been disclosed, and claimed, in U. S. P. 2,051,189 of H. M. Wagner, patented August 18, 1936, an electron ray indicator tube of the 6E5 type. Briefly, such a tube comprises an envelope having within it a cathode provided with two emission sections. One of the latter sections is surrounded by amplifier electrodes, and the other is surrounded by the tuning indicator elements. The indicator elements comprise a control electrode and an anode coated with fluorescent material. The control electrode is connected to the amplifier anode, and the amplifier section input electrode is connected to a source of signal-derived direct current voltage. When maximum signal is tuned in, the luminous portion of the plate, or target, is of a maximum width. With minimum, or no, signal the electronic shadow cast by the control electrode on the target is a maximum. In a receiving system equipped with automatic volume control (AVC), the grid of the indicator tube amplifier section is connected to the AVC voltage source.

Such a 6E5 type tube is satisfactory when used in receiver systems producing direct current voltages for the indicator tube input grid which are not in excess of —8 volts. This is due to the sharp cut-off characteristic of the amplifier section of the indicator tube; the amplifier section has a high mu. Hence, when the value of the AVC bias applied to the input grid of a 6E5 tube is in excess of —8 volts, the shadow angle on the target remains closed. There is no further indication of approach to the desired resonance condition of the receiver. To solve this problem the 6G5 type tube is provided. This tube differs from the 6E5 type only in that it is provided with a remote cut-off input grid. However, while permitting the tube to be used in receiving circuits with AVC voltages in excess of —8 volts, the change in shadow angle with grid bias is small at low AVC voltages.

Accordingly, it is one of the main objects of this invention to provide an electron ray indicator tube which is capable of functioning as a reliable indicator of a wide range of input direct current voltages; the tube essentially consisting of two separate triodes, of different mus, having a common cathode, input grid and individual plates, the indicator section including two control electrodes which produce two shadows on the fluorescent anode on opposite sides of the cathode.

Another important object of the invention is to improve electron ray indicator tubes of the type adapted to produce a shadow of varying width as the magnitude of the direct current voltage input varies; the improvement comprising independent high mu and low mu amplifier sections constructed and arranged to produce opposed shadows on the target, and which shadows successively narrow in width as the said input voltage varies over a wide range of values.

Other objects of the invention are to improve generally the efficiency and utility of electron ray indicator tubes and circuits embodying them, and more especially to provide an electron ray indicator tube circuit which is not only reliable over a relatively wide range of input voltage value variation, but is economically manufactured and assembled in a radio receiver utilizing automatic volume control.

The novel features which we believe to be characteristic of our invention are set forth in particularity in the appended claims; the invention itself, however, as to both its organization and method of operation will best be understood by reference to the following description taken in connection with the drawing in which we have indicated diagrammatically a circuit organization whereby our invention may be carried into effect.

In the drawing:

Fig. 1 is a circuit diagram of a portion of a receiving circuit embodying the invention.

Figure 2A:
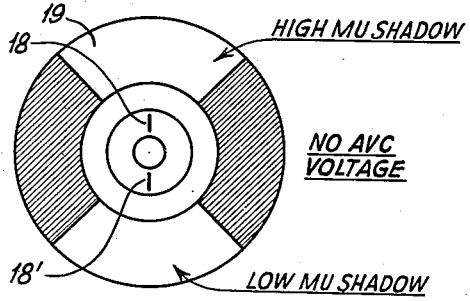

Figs. 2a, b, c and d show the successive appearances of the indicator face of the target as the AVC voltage varies in magnitude.

In the circuit shown in Fig. 1 a diode detector, or rectifier, 1 has its anode 2 and cathode 3 connected to opposite sides of the secondary winding 4 of the double tuned transformer 5. The primary circuit 6, as well as the secondary circuit 4, is tuned to the operating I. F., assuming the detector is used in a superheterodyne receiver. The usual networks are employed in the latter i. e., a tunable radio amplifier, a tunable first detector, a tunable local oscillator and one, or more, I. F. amplifiers. The customary uni-control tuning adjusting means will be used for varying the rotors of the variable tuning condensers, and the circuit 6 is to be understood as being in the plate circuit of the last I. F. amplifier tube. These networks are not shown since those skilled in the art are fully aware of the construction thereof.

The diode rectifier network comprises resistor 7, shunted by I. F. by-pass condenser 8. The grounded cathode 3 is connected to the low alternating potential side of input circuit 4 through the resistor 7. The audio voltage component of detected I. F. current is impressed on one, or more, audio amplifiers by means of the adjustable tap 9 and audio coupling condenser 10. A reproducer of any desired type follows the last audio amplifier. The direct current voltage component of detected I. F. current is employed for automatic volume control (AVC) of the pre-second detector stages, as, for example, the radio and I. F. amplifiers. The AVC lead is connected to the anode side of resistor 7 through filter resistor 11, and condenser 12 by-passes audio currents to ground. The network 11—12 is given the proper time constant to permit the AVC circuit to compensate for carrier fading effects.

The tuning indicator tube comprises an envelope 13 within which are disposed the electrodes of the indicator section, and the high and low mu direct current amplifier sections. The tube is schematically represented since its detailed constructional features are shown in the aforesaid Wagner patent. Those skilled in the art will readily be able to construct a tube embodying the present invention by modifying the tube of said Wagner patent in the light of the present teachings.

The tube is provided with a cathode 13 of the conventional, indirectly-heated, equipotential type; a grid 14 is concentric, and almost co-extensive, with and surrounds the cathode. A pair of anodes 15 and 16, of the same diameter, are co-axially arranged in spaced relation and surround the grid 14. The anodes 15 and 16 are substantially co-extensive with the cathode 13. The portion of grid 14 lying between cathode 13 and anode 16 has at least one turn less than the grid portion between anode 15 and cathode 13. By way of illustration it will be seen that there are five grid turns between anode 15 and cathode 13, whereas only four grid turns are provided between cathode 13 and anode 16. The control grid 14 is wound with a continuous pitch, turns being removed from one end to impart a lower mu to that section of the grid. Hence, it will be seen that a pair of triode sections are provided, one having a higher mu than the other.

The cathode 13 is extended upwardly and provided with a second emitting section 17. A pair of similar control electrodes 18 and 18' are disposed on opposite sides of emission section 17. The electrodes 18—18' may be rods, or vane-shaped sheet material placed edgewise to the cathode 17. Surrounding and concentric with the emission section 17 is an anode 19 shaped like a dishpan having a coating 20 on its inner inclined face; the coating material being fluorescent under electron bombardment. An aperture is provided in the base of the anode 19 to permit the emission section 17 and electrodes 18—18' to be positioned at the axis of the anode.

The electrode 18 is connected by lead 21 to plate 15, while electrode 18' is connected to plate 16 by lead 22. Electrons emitted from section 17, and striking coating 20 with sufficient velocity, cause it to fluoresce. A cap (not shown) is usually provided over the top end of cathode section 17 to confine electron motion, and to act as an electrostatic shield against stray charges on the glass envelope. The electrons travel radially outwardly from the cathode 17 to the coating 20 in a wide beam. The extent of the anode surface reached by the beam is determined by the direct current voltages on control electrodes 18—18'. Two separate luminescent portions will be obtained when the receiver is off tune. The pattern of light will extend around the entire circumference of anode 19 when the receiver is tuned to resonance.

The control electrodes 18—18' are at positive potentials with respect to cathode 17. This is accomplished by connecting plates 15 and 16 to a source of positive direct current voltage; resistor 23 connecting plate 16 to the positive terminal of the voltage source, and resistor 24 connecting plate 15 to the said terminal. The cathodes 13 and 17 are at ground potential, and fluorescent anode 19 is connected to the positive terminal of the direct current voltage source. A direct current connection establishes control grid 14 at the potential of the anode side of resistor 7. Thus, the AVC bias varies the potential of control grid 14, and hence the potentials of control electrodes 18—18'.

In the absence of received signals there is no AVC bias produced, since the detector 1 does not produce detected signal currents. In that case, the control grid 14 will be substantially at the potential of cathode 13, and the current flow through the high and low mu sections will be a maximum. This means that the voltage drops across resistors 23 and 24 will be a maximum, and, therefore, control electrodes 18 and 18' will be at minimum positive potential with respect to grounded cathode 17. As a result of this low positive bias on both control electrodes, electrons will be repelled from the latter, and the pattern shown in Fig. 2a will be formed on the coating 20.

The shaded areas in Fig. 2a represent the luminous areas, while the blank areas denote shadows. Electrode 18 produces the so-called "high mu shadow" since this electrode varies in bias with space current variation in the high mu triode section of the tube; electrode 18' produces the "low mu shadow" since it responds in bias to the space current change in the low mu triode section. Fig. 2a, further, shows the appearance of anode 19 when viewed from the right side of the tube in Fig. 1. The dark, or shadow, spaces are depended upon to indicate resonance conditions of the receiver.

Figure 2B:
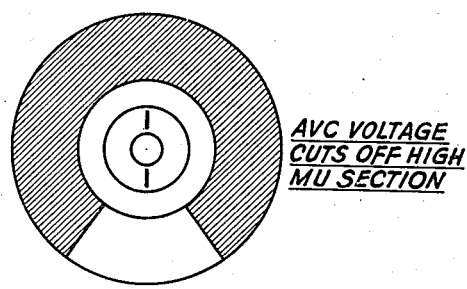

Assume, now, that weak signals are received, and a small amount of AVC bias is generated. The space current flowing through the high mu section of grid will be reduced immediately. The shadow angle of the high mu shadow on anode 19 begins to close. At some low bias (—5 to —8 volts) determined by the pitch of the high mu grid, the shadow angle becomes zero. This condition is shown in Fig. 2b. Up to this point only a small change in the angle of the low mu shadow has taken place.

Figure 2C:
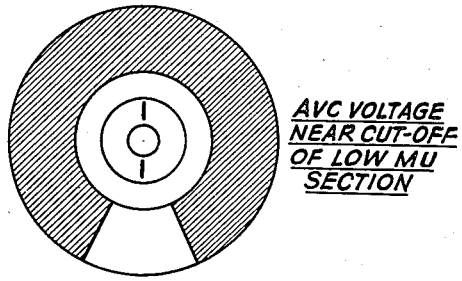
Figure 2D:
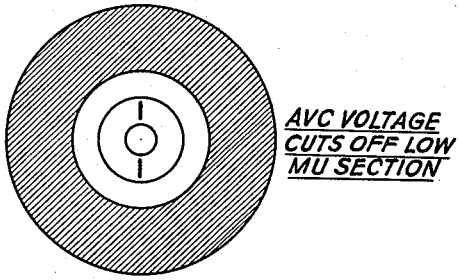

Further increase in AVC bias causes the shadow angle of the low mu section to close. Fig. 2c shows the appearance of the anode 19 when the low mu shadow is near cut-off. The bias at which the low mu shadow angle is zero can be made equal to —30 to —40 volts depending upon the maximum AVC voltage available. Fig. 2d shows the latter condition. Accordingly, it will be seen that the indicator tube of the present invention is capable of responding to a relatively wide range of AVC voltages, and that this is done with a single tube construction.

By proper choice of the structural dimensions of the tube and triode section plate loads, conditions can be adjusted so as to cause the two shadows to respond to any reasonable AVC voltage ranges. Of course, Fig. 2a shows the appearance of the tube when off tune, or when very weak carrier is being received. Fig. 2d, on the other hand, shows the tuning indicator's appearance when the receiver is exactly tuned to a strong incoming carrier. Intermediate conditions are shown by Figs. 2b and 2c.

While we have indicated and described a system for carrying our invention into effect, it will be apparent to one skilled in the art that our invention is by no means limited to the particular organization shown and described, but that many modifications may be made without departing from the scope of our invention, as set forth in the appended claims.

What we claim is:

1. In combination with a source of direct current voltage varying over a relatively wide range of values, an indicator tube comprising a fluorescent anode, an electron emitter adapted to render said anode luminous by electronic bombardment, a pair of control electrodes positioned in different parts of the electron stream to the anode, a high mu electron discharge device responsvie to said voltage and having its output circuit connected to one of the control electrodes, a low mu device responsive to said voltage and having its output circuit connected to the other control electrode, said two control electrodes producing shadow areas on said anode which disappear successively as said voltage increases in value over said range.

2. In combination with a signal detector adapted to produce a direct current voltage varying in magnitude with received signal carrier amplitude, a device adapted to become luminous upon electronic bombardment, an electron emitter therefor, a pair of electron control electrodes positioned at different locations in the electron stream to said device, an amplifier having a high mu, means impressing said voltage upon the input electrodes of the amplifier, an impedance in the amplifier output circuit to develop a voltage from the amplifier output current, means impressing the last voltage on one of said control electrodes, a low mu amplifier, means impressing said first voltage on the input electrodes of the second amplifier, an impedance in the output circuit of the latter, and means impressing the voltage developed by the last impedance on the other control electrode.

3. In combination with a signal detector adapted to produce a direct current voltage varying in magnitude with received signal carrier amplitude, a device adapted to become luminous upon electronic bombardment, an electron emitter therefor, a pair of electron control electrodes positioned at different locations in the electron stream to said device, an amplifier having a high mu, means impressing said voltage upon the input electrodes of the amplifier, an impedance in the amplifier output circuit to develop a voltage from the amplifier output current, means impressing the last voltage on one of said control electrodes, a low mu amplifier, means impressing said first voltage on the input electrodes of the second amplifier, an impedance in the output circuit of the latter, and means impressing the voltage developed by the last impedance on the other control electrode, and the electrodes of the two amplifiers being in the same tube envelope as the emitter, luminous device and two control electrodes.

4. In combination with a signal detector adapted to produce a direct current voltage varying in magnitude with received signal carrier amplitude, a device adapted to become luminous upon electronic bombardment, an electron emitter therefor, a pair of electron control electrodes positioned at different locations in the electron stream to said device, an amplifier having a high mu, means impressing said voltage upon the input electrodes of the amplifier, an impedance in the amplifier output circuit to develop a voltage from the amplifier output current, means impressing the last voltage on one of said control electrodes, a low mu amplifier, means impressing said first voltage on the input electrodes of the second amplifier, an impedance in the output circuit of the latter, and means impressing the voltage developed by the last impedance on the other control electrode, said two control electrodes being positioned on opposite sides of the emitter to produce opposed shadows on the device when the electrodes are negative with respect to the emitter.

5. In combination with a signal detector adapted to produce a direct current voltage varying in magnitude with received signal carrier amplitude, a device adapted to become luminous upon electronic bombardment, an electron emitter therefor, a pair of electron control electrodes positioned at different locations in the electron stream to said device, an amplifier having a high mu, means impressing said voltage upon the input electrodes of the amplifier, an impedance in the amplifier output circuit to develop a voltage from the amplifier output current, means impressing the last voltage on one of said control electrodes, a low mu amplifier, means impressing said first voltage on the input electrodes of the second amplifier, an impedance in the output circuit of the latter, and means impressing the voltage developed by the last impedance on the other control electrode, and the input electrodes of both amplifiers being a common cathode and control grid, the latter being constructed to produce the low mu characteristic in the low mu amplifier.

6. In a visual indication apparatus, an anode provided with a fluorescent coating, at least two spaced electrodes adjacent an electron emission element adapted to produce a pair of independent shadow areas on said anode, an electron discharge device having an electron emission element, an input electrode, and at least two cold electrodes each at a positive potential, each cold electrode having an impedance operatively associated therewith, each of said two spaced electrodes being connected to a predetermined one of said impedances, a source of direct current voltage of variable magnitude connected to said input electrode, and said discharge device being constructed to vary the potentials of said spaced electrodes at different rates in response to changes in said variable voltage whereby the said shadow areas are altered at different rates.

7. In a receiver system of the type embodying an automatic gain control circuit, a visual indicator arrangement comprising means providing a pair of independent shadow areas on a fluorescent target, and additional means, responsive to variations of the control voltage of said control circuit, for varying the extent of said shadow areas at different rates.

8. In a radio receiver employing an automatic volume control circuit, an indicator tube having means providing a luminous area with at least two spaced shadow areas embodied therein, and additional means, responsive to said control circuit, for varying the magnitudes of said shadow areas at different rates.

9. In a radio receiver employing an automatic volume control circuit, an indicator tube having means providing a luminous area with at least two spaced shadow areas embodied therein, and additional means, responsive to said control circuit, for varying the magnitudes of said shadow areas at different rates and in succession.

10. In combination with a tube of the type having means providing at least two spaced indication areas, a source of voltage whose magnitude varies over a range, means, responsive to said voltage, for differentially changing the magnitudes of said indication areas over said range.

11. A method of indicating the variation of a direct current voltage over a wide range of magnitudes, which includes bombarding a fluorescent target with electrons to provide a luminous area, electrostatically repelling electrons from at least two spaced zones of the luminous area, and successively eliminating said spaced zones in response to changes in magnitude over said range.

CHARLES N. KIMBALL.
EDWARD W. WILBY.